United States Patent [19]

Gruel

[11] Patent Number: 5,950,348
[45] Date of Patent: Sep. 14, 1999

[54] FISHING LURE ADAPTER

[76] Inventor: Alfredo Gruel, Miguel Negrete 1699, Mexicali, Baja California, Mexico

[21] Appl. No.: 08/904,858

[22] Filed: Aug. 1, 1997

Related U.S. Application Data

[60] Provisional application No. 60/022,966, Aug. 2, 1996.

[51] Int. Cl.$^6$ .................................................. A01K 85/00
[52] U.S. Cl. .......................... 43/42.49; 43/43.1; 43/43.15; 43/42.74
[58] Field of Search .................................. 43/43.1, 43.13, 43/43.15, 42.23, 42.49, 42.74, 44.83, 44.84, 44.85

[56] References Cited

U.S. PATENT DOCUMENTS

| | | | |
|---|---|---|---|
| 1,050,529 | 1/1913 | Fearing | 43/43.13 |
| 2,274,131 | 2/1942 | Edberg | 43/44.83 |
| 2,547,469 | 4/1951 | Husson . | |
| 2,592,664 | 4/1952 | De Mello | 43/44.82 |
| 2,615,275 | 10/1952 | De Mello | 43/42.74 |
| 2,663,966 | 12/1953 | De Mello | 43/42.74 |
| 2,729,014 | 1/1956 | Johnson | 43/42.49 |
| 2,766,547 | 10/1956 | Gallagher | 43/42.74 |
| 2,791,060 | 5/1957 | Kender | 43/44.9 |
| 2,808,678 | 10/1957 | Leonardi | 43/44.85 |
| 2,880,547 | 4/1959 | Mills . | |
| 2,930,159 | 3/1960 | Culhane | 43/42.74 |
| 2,935,810 | 5/1960 | Giguere | 43/42.74 |
| 2,984,930 | 5/1961 | Fadely | 43/44.84 |
| 3,001,319 | 9/1961 | Sonner, Jr. | 43/42.74 |
| 3,118,245 | 1/1964 | Shriver | 43/43.15 |
| 3,210,883 | 10/1965 | Ulsh | 43/43.12 |
| 3,403,466 | 10/1968 | Young . | |
| 3,421,250 | 1/1969 | Krieg | 43/42.74 |
| 3,747,254 | 7/1973 | Caruso . | |
| 3,778,921 | 12/1973 | Peterson | 43/44.83 |
| 3,824,732 | 7/1974 | Boone . | |
| 3,905,144 | 9/1975 | Shaw | 43/42.74 |
| 4,619,070 | 10/1986 | Jung . | |
| 4,727,676 | 3/1988 | Runyan | 43/43.1 |
| 4,829,696 | 5/1989 | Sorenson | 43/42.74 |
| 4,856,224 | 8/1989 | Fincher, Sr. | 43/43.12 |
| 4,965,956 | 10/1990 | Bethel | 43/43.1 |
| 5,033,226 | 7/1991 | Jackson | 43/43.12 |
| 5,065,542 | 11/1991 | Lindaberry | 43/42.74 |
| 5,083,394 | 1/1992 | Harwig | 43/43.15 |
| 5,189,827 | 3/1993 | Mrozek | 43/42.74 |
| 5,253,447 | 10/1993 | Rhinehart | 43/42.74 |
| 5,301,454 | 4/1994 | Chen | 43/42.74 |
| 5,301,455 | 4/1994 | Harold | 43/42.74 |

FOREIGN PATENT DOCUMENTS

| | | | |
|---|---|---|---|
| 479613 | 12/1951 | Canada | 43/42.74 |
| 2629984 | 10/1989 | France | 43/43.1 |
| 2658990 | 9/1991 | France | 43/43.1 |
| 14525 | of 1905 | United Kingdom | 43/43.1 |
| 7644 | of 1910 | United Kingdom | 43/42.74 |
| 2068201 | 8/1981 | United Kingdom | 43/43.1 |
| 2272620 | 5/1994 | United Kingdom | 43/43.13 |

*Primary Examiner*—Michael J. Carone
*Assistant Examiner*—Darren Ark
*Attorney, Agent, or Firm*—Knobbe Martens Olson & Bear, LLP

[57] ABSTRACT

A system for maintaining a fishing lure in a generally horizontal position is described. The fishing lure has an adapter on its nose that mates perpendicularly with a matching adapter on a mounting rod. The mounting rod is weighted at one end so that it maintains a generally vertical position while submersed in water.

18 Claims, 3 Drawing Sheets

FISHING LURE ADAPTER

RELATED APPLICATIONS

This application claims priority from U.S. Provisional Application Ser. No. 60/022,966, filed Aug. 2, 1996.

BACKGROUND OF THE INVENTION

1. Field of the Invention

This invention relates to devices that aid fishermen. Specifically, this invention relates to adapters for positioning fishing lures in the water.

2. Description of the Related Art

Fishing lures typically are portrayed to resemble small fish. During trolling, wherein a lure is dragged behind a slowly moving boat, the nose of the lure is attached to a leader, which links to a fishing line so that the lure remains in a horizontal position and appears as a live, swimming fish. Because the lure appears to be alive while trolling, it is more attractive to fish.

However, lures are typically not used in deep-sea fishing, wherein the boat is anchored or adrift. Since the boat is generally stationary, and standard lures attach to the leader at their nose, the lure is held in a vertical position, thereby resembling a dead fish in the water. Because the lures look dead, they are not as attractive to live fish as other types of bait.

In addition, another problem with using standard lures in anchored deep sea or lake fishing, or fishing where the boat is adrift, is that the lure's hooks frequently become tangled with the fishing line or leader. This is due to the lure being held in a vertical position and being able to pivot around the leader.

Therefore, a need exists for a device that allows fishermen to effectively use lures for anchored or adrift deep-sea fishing. There is also a need for devices which prevent the fishing line and leader from becoming tangled with the lure during this type of fishing.

SUMMARY OF THE INVENTION

The present invention is an adapter and lure system that allows a fisherman to use lures while deep-sea fishing off of an anchored boat or an adrift, unanchored boat. The system of the present invention holds the fishing lure in a generally horizontal position, thereby making the lure appear to be a live fish.

The system of the present invention comprises a lure and an adapter for holding the lure in a horizontal position. According to the invention, the fishing lure has a tab at either the nose or tail. This tab mates with a matching mounting hole drilled perpendicularly into an elongated support, such as a rigid rod. When the mounting hole is mated with the tab, the lure is held perpendicular to the rod. This will be explained in more detail below.

An eyelet is attached to the top and bottom of the rod by a swivel connection. In addition, a ring is attached to the lure at some distance away from the mounting hole for connecting to the fishing line. At least one single, double, or treble hook is attached to the bottom of the lure. The fishing line attached to the leader that comes from the rod is threaded through the eyelet at the top of the rod and mounts to the lure at the ring. A weight is attached to the eyelet on the bottom of the rod so that the rod remains perpendicular to the ocean or lake bottom while in use. As can be imagined, the lure system of the present invention advantageously allows the use of specialized lures for deep sea fishing by positioning the lure horizontally in the water, thereby resembling a live fish and preventing the hooks from becoming tangled with the fishing line and leader.

DETAILED DESCRIPTION OF THE PREFERRED EMBODIMENT

As discussed above, the present invention is an adapter and lure system that allows a fisherman to use lures while either deep-sea fishing off of an anchored boat or in an adrift, unanchored boat. The system of the present invention holds the fishing lure in a horizontal position, thereby appearing to be a live fish.

Figure 1:
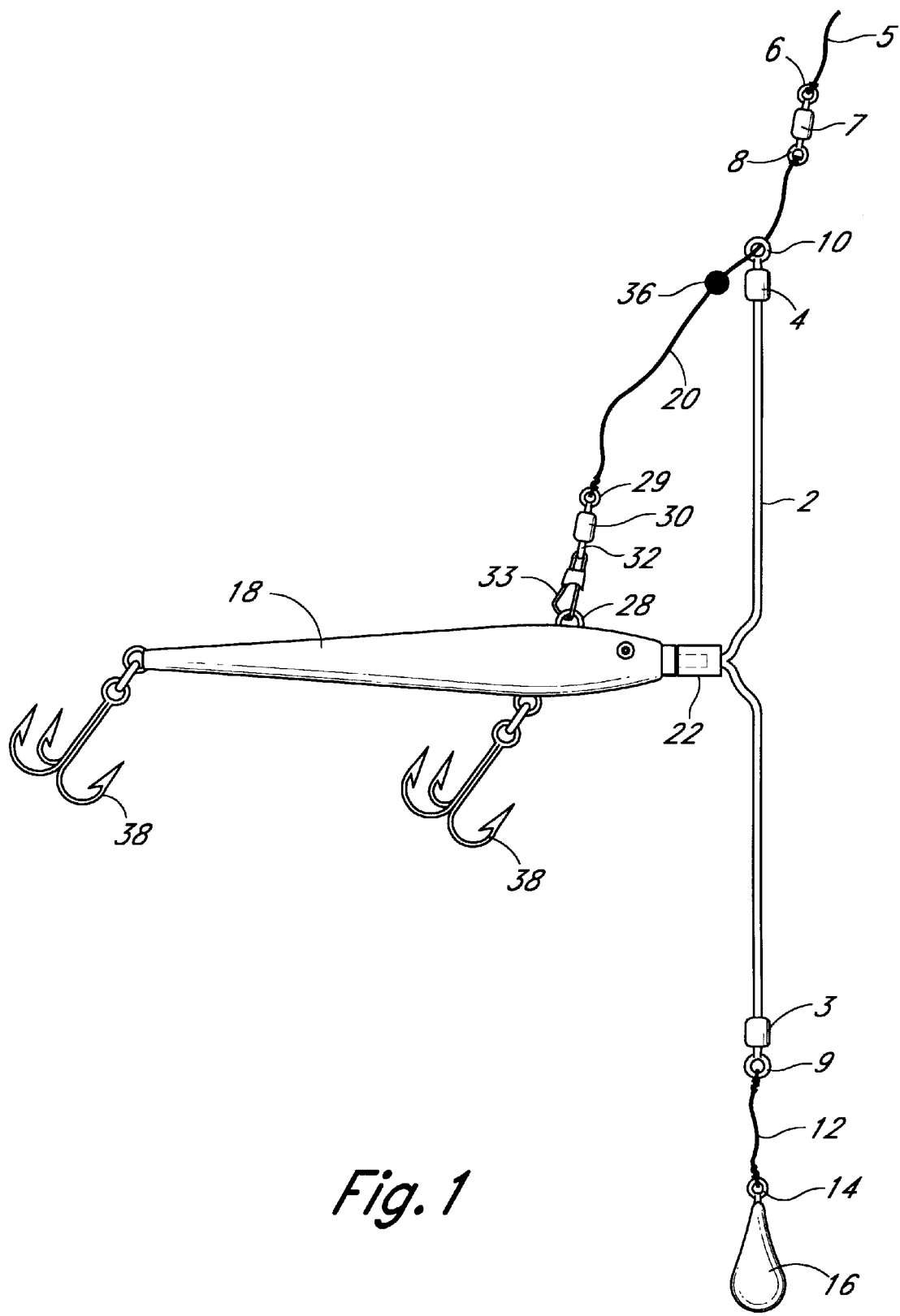
FIG. 1 is an elevational view of the system of the present invention and depicts a lure mated with an adaptor assembly.

Referring now to FIG. 1, one embodiment of the invention can be seen. As shown, the lure system 1 has a stiff, generally straight rod 2. The rod 2 is preferably about 15 inches long, although one of ordinary skill in the art could readily adjust the rod length to many sizes. The rod 2 can be made of any metallic or transparent plastic material known to those skilled in the art. In addition, although a rigid rod is discussed, it should be noted that any elongated support that could hold the fishing lure in a generally horizontal position would be within the scope of the present invention. The rod 2 is preferably made of a transparent material, such as plastic, so that the rod 2 is more invisible to fish while submersed in water.

At the lower and upper ends of the rod are swivels 3 and 4, respectively. A fishing line 5 coming from a fishing rod is tied to eyelet 6 which is connected to a swivel 7. The opposite end of swivel 7 is connected to eyelet 8. A leader 20 is attached to the lower portion of eyelet 8. Swivel 7 and eyelets 6 and 8 thereby connect fishing line 5 to leader 20. The leader 20 is preferably made of stainless steel, plastic monofilament, or any other suitable material known to those skilled in the art that is flexible but strong enough to resist breakage after a fish strikes. Swivels 3 and 4 each have an attached eyelet 9 and 10. Thus, the eyelets 9, 10 can freely rotate around the rod 2 by virtue of their associated swivels 3 and 4.

Passing through one end of the lower eyelet 9 is a leader 12 that hooks through eyelet 9 and attaches to a fastener 14 on a weight 16. The leader 12 is preferably made of fishing line or some other transparent, yet strong material. Thus, the weight 16 is detachably secured to the swivel 9 by the leader 12. In addition, the weight 16 can freely rotate about the longitudinal axis of the rod 2 by virtue of its connection through the swivel 3.

As can be imagined, the length of the leader 12 can be adjusted so that rod 2 is positioned at a preselected distance from the ocean or lake bottom. For example, if the leader 12 is 5 inches in length, the lure system 1 will be positioned very near the ocean or lake bottom. However, if the leader 12 is 50 feet in length, the lure system 1 will be suspended at approximately 50 feet from the ocean or lake bottom.

Removably attached to the rod 2 is a lure 18 that preferably resembles a fish. Fishing leader 20 attaches to the lure 18 so that a fish can be reeled in once it is caught by the lure. As shown, the lure 18 is removably attached to the rod 2 though an adapter 22. One of ordinary skill in the art will appreciate that swivels 3 and 4, and leader 12 are capable of angular movement with respect to each other, advantageously allowing lure 18 to rotate about rod 2 while maintaining its horizontal position.

Mounted to the top of lure 18 is a ring 28 which acts as an anchor for fishing leader 20. As shown in FIG. 1, the fishing leader 20 ties to an eyelet 29 which is in rotatable communication with a swivel 30. The lower end of the swivel 30 mounts to an eyelet 32 which holds a snap 33. The snap 33 thereby connects fishing leader 20 to the lure 18 by attaching to the ring 28.

Prior to mounting to the lure 18, the fishing leader 20 threads through eyelet 10 at the upper end of rod 2. Tied to the fishing leader 20, near eyelet 29 is a small stopper 36. Stopper 36 prevents the lure 18 from being prematurely removed from the adapter 22 by inadvertent pulls on the leader 20. Thus, the stopper 36 allows the leader 20 to maintain some tension between eyelet 10 and the fishing rod (not shown), but prevents the portion of the leader 20 between stopper 36 and eyelet 29 from becoming too taut and hindering lure 18 from decoupling from the rod 2. The size of the stopper 36 is selected so that it cannot go through eyelet 10.

Located at the bottom of the lure 18 are single, double, or treble hooks 38 which are designed to catch fish that strike the lure 18. As can be seen upon reference to FIG. 1, the hooks 38 will not become tangled with leader 20 because lure 18 is prevented from spinning vertically in the water. As discussed above, without the lure system of the present invention, the lures would normally spin vertically in the water. The hooks located at the bottom of each lure would then have a great chance of becoming tangled with the leader as the lure rotated. With the lure system of the present invention, the leader 20 is kept a distance from the hooks 38 so that they will not become tangled together.

Figure 2:
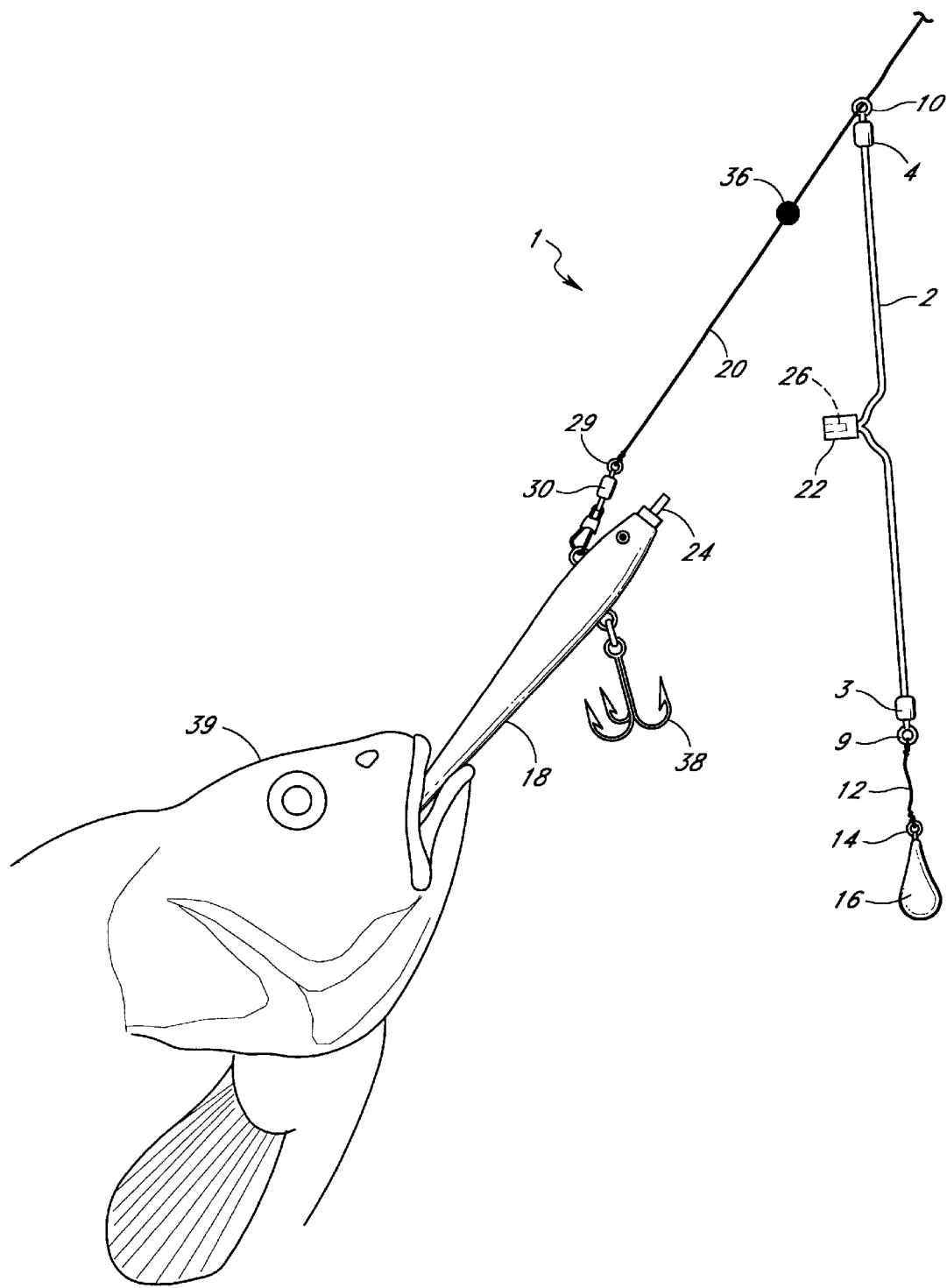
FIG. 2 is an elevational view of the system of the present invention and illustrates the position of the lure and adapter after a fish has struck and decoupled the lure from the adaptor assembly.

Referring to FIG. 2, the lure system 1 is shown with the lure 18 removed from the rod 2. In practice, a fish 39 grabs the lure 18 and pulls it away from the rod 2. As shown, the lure 18 generally resembles a small fish. The lure 18 has a small tab 24 at the front of its nose. One of ordinary skill will appreciate that a similar tab could be positioned at the rear of the lure 18 and function in a similar manner. The tab 24 is directed along the length of the lure. Mounting hole 26 is drilled into adaptor 22 in a direction perpendicular to the stiff rod 2. When mated, mounting hole 26 and tab 24 fit snugly together. During use, lure 18 remains perpendicular to rod 2 thereby advantageously resembling a live fish as it swims in the water.

Figure 3:
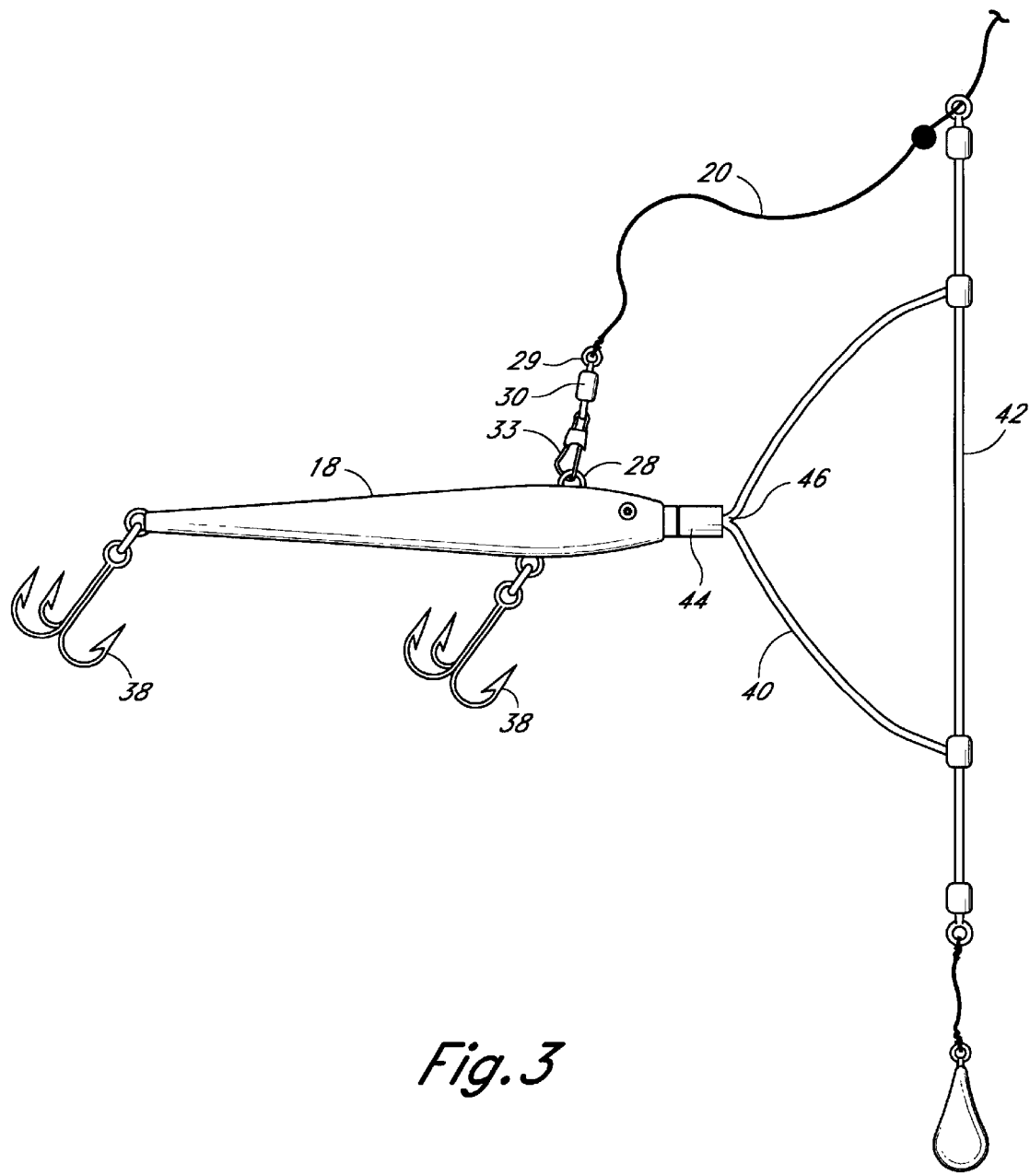
FIG. 3 is an elevational view of another embodiment of the adaptor assembly mated with the lure.

Another embodiment of the invention, shown in FIG. 3, has a generally triangular frame 40 attached to stiff rod 2 at two corners by a means which permits the frame 40 to generally rotate about the rod 42. Frame 40 will typically be made of the same material as rod 42. Adaptor 44 is attached to the corner 46 of frame 40 which is not attached to rod 42. The rotating frame 40 of this embodiment allows lure 18 to resemble a swimming fish during rotation about rod 42.

It will be understood that the above-described arrangements of apparatus and the methods therefrom are merely illustrative of applications of the principles of this invention and many other embodiments and modifications may be made without departing from the spirit and scope of the invention.

We claim:

1. A fishing system, comprising:

a fishing lure in the shape of a fish having a first adapter and a ring for fixedly attaching to a line; and an elongated support having a top comprising an eyelet for sliding along a fishing line and a second adapter configured to detachably mate with said first adapter, wherein said fishing lure and said elongated support are disposed generally perpendicular to one another when said first adapter is mated with said second adapter.

2. The fishing system of claim 1, wherein said first adapter comprises a mounting post and said second adapter comprises a mounting hole.

3. The fishing system of claim 2, wherein said mounting post is in the nose portion of said fishing lure.

4. The fishing system of claim 1, wherein said second adapter is centrally located on said elongated support.

5. The fishing system of claim 1, wherein said second adapter comprises a generally triangular frame in communication with said elongated support.

6. The fishing system of claim 5, wherein said triangular frame is rotatable about said elongated support.

7. The fishing system of claim 1, further comprising a weight in communication with said elongated support, wherein said weight maintains said elongated support in a generally vertical position while it is under water.

8. The fishing system of claim 1, wherein said elongated support is a rod.

9. In combination:

a fishing lure in the shape of a fish having a first adapter and a ring for fixedly attaching to a line;

a rigid elongated support having a top comprising an eyelet for slidably receiving a fishing line, and a bottom; and a second adapter disposed on said elongated support between said top and said bottom and configured to detachably mate with said first adapter, wherein said fishing lure and said elongated support are disposed generally perpendicular to one another when said first adapter is mated with said second adapter.

10. The combination of claim 9, wherein said first adapter comprises a mounting post and said second adapter comprises a mounting hole.

11. The combination of claim 10, wherein said mounting post is in the nose portion of said fishing lure.

12. The combination of claim 9, wherein said second adapter is centrally located on said elongated support.

13. The combination of claim 9, wherein said second adapter comprises a generally triangular frame in communication with said elongated support.

14. The combination of claim 13, wherein said triangular frame is rotatable about said elongated support.

15. The combination of claim 9, further comprising a weight in communication with said elongated support, wherein said weight maintains said elongated support in a generally vertical position while it is under water.

16. The combination of claim 9, wherein said elongated support is a rod.

17. A method for fishing, comprising the steps of:

a) detachably mounting a fishing lure in the shape of a fish to an elongated support, wherein said fishing lure and said elongated support are disposed generally perpendicular to one another;

b) contacting a fishing line from a fishing rod with said elongated support so that said elongated support can slide along the longitudinal length of said fishing line;

c) fixedly attaching one end of said fishing line to said fishing lure so that said fishing lure will disengage from said elongated support, but remain attached to said fishing line after hooking a fish.

18. The method of claim 17, further comprising the step of connecting a weight to said elongated support so that said elongated support will remain in a mostly vertical position while submerged in water.

* * * * *